(12) United States Patent
Volkening et al.

(10) Patent No.: US 11,550,877 B2
(45) Date of Patent: Jan. 10, 2023

(54) ROOT OF TRUST

(71) Applicant: MaxLinear, Inc., Carlsbad, CA (US)

(72) Inventors: Ingo Volkening, Singapore (SG); Ritesh Banerjee, Bangalore (IN); Olaf Wachendorf, Unterhaching (DE); Stephan Pruecklmayer, Hoehenkirchen-Slegertsbrunn (DE)

(73) Assignee: MaxLinear, Inc., Carlsbad, CA (US)

( * ) Notice: Subject to any disclaimer, the term of this patent is extended or adjusted under 35 U.S.C. 154(b) by 1110 days.

(21) Appl. No.: 15/303,852

(22) PCT Filed: Apr. 15, 2015

(86) PCT No.: PCT/EP2015/058165
§ 371 (c)(1),
(2) Date: Oct. 13, 2016

(87) PCT Pub. No.: WO2015/158772
PCT Pub. Date: Oct. 22, 2015

(65) Prior Publication Data
US 2017/0039352 A1    Feb. 9, 2017

(30) Foreign Application Priority Data
Apr. 15, 2014   (SG) .............................. 10201401546T

(51) Int. Cl.
*G06F 21/10* (2013.01)
*G06F 21/57* (2013.01)
(Continued)

(52) U.S. Cl.
CPC .............. *G06F 21/10* (2013.01); *G06F 21/57* (2013.01); *G06F 21/575* (2013.01);
(Continued)

(58) Field of Classification Search
CPC ........ G06F 21/10; G06F 21/575; G06F 21/57; H04L 63/061; H04L 63/06; H04L 63/0281; H04L 9/3247
(Continued)

(56) References Cited

U.S. PATENT DOCUMENTS 6,263,378 B1 * 7/2001 Rudoff ................. G06F 9/4411
713/2
9,230,112 B1 * 1/2016 Peterson ............... G06F 21/575
(Continued)

FOREIGN PATENT DOCUMENTS

JP   2009252244 A   10/2009
JP   2011527845 A   11/2011
JP   2012502547 A    1/2012

OTHER PUBLICATIONS

European Office Action dated Oct. 16, 2018 for European Patent Application 15719424.2.
(Continued)

*Primary Examiner* — Mohammad W Reza
(74) *Attorney, Agent, or Firm* — Buchalter; Jason W. Croft

(57) ABSTRACT

First transistor logic is arranged by a first logic provider in circuit form and provides a minimum of functionality of the semiconductor device employed to bring up the semiconductor device, wherein the minimum of functionality is encrypted using a first encryption key. Second transistor logic is arranged by a second logic provider, different than the first logic provider, in circuit form to include security keys capable to perform cryptographic capabilities using a second encryption key. The second transistor logic further includes functionality that completes the semiconductor device as a chip device and is ready to process secure communication signals.

12 Claims, 10 Drawing Sheets

(51) Int. Cl.
*H04L 9/32* (2006.01)
*H04L 9/40* (2022.01)
(52) U.S. Cl.
CPC ........ *H04L 9/3247* (2013.01); *H04L 63/0281* (2013.01); *H04L 63/06* (2013.01); *H04L 63/061* (2013.01)
(58) Field of Classification Search
USPC .......................................................... 713/171
See application file for complete search history.

(56) References Cited

U.S. PATENT DOCUMENTS

| | | | |
|---|---|---|---|
| 2007/0288761 A1* | 12/2007 | Dale ..................... | G06F 9/4405 713/189 |
| 2011/0022832 A1* | 1/2011 | Motohama .............. | G06F 9/441 713/2 |
| 2012/0210115 A1 | 8/2012 | Park et al. | |
| 2013/0019105 A1 | 1/2013 | Hussain | |
| 2013/0091345 A1 | 4/2013 | Shroff et al. | |
| 2013/0173899 A1 | 7/2013 | Geukes et al. | |
| 2014/0164725 A1* | 6/2014 | Jang ..................... | G06F 21/575 711/163 |
| 2014/0189340 A1* | 7/2014 | Hadley .................. | G06F 21/54 713/2 |

OTHER PUBLICATIONS

International Search Report and the Written Opinion of the International Searching Authority, PCT/EP2015/058165, dated Jul. 30, 2015.

* cited by examiner

Secure Manufacturing

ROOT OF TRUST

REFERENCE TO RELATED APPLICATIONS

This application is a National Phase entry application of International Patent Application No. PCT/EP2015/058165 filed on Apr. 15, 2015, which claims priority to Singapore Application SG 10201401546T, filed on Apr. 15, 2014 the contents of which are herein incorporated by reference in their entirety.

FIELD

Various embodiments relate to a device and a semiconductor device. Various embodiments relate to techniques of transferring a root-of-trust.

BACKGROUND

In semiconductor manufacturing and production of silicon chip products, the manufacturer's or vendor's chips are created with all of the hardware in the form of electronic circuits built into the layout designs of the chip. However, the product still needs to function in a particular way as desired by the end customer. A number of network processors today, including gateway and Set Top Box processors require an Operating System (OS). Just like a new Personal Computer (PC) must have the OS installed, whether this is MS Windows, Linux or other, the network processor also requires an OS that needs to be installed before use.

In the past, and it is still true today, the chip manufacturer programs the network processor for the end user with dedicated key material used for identification. However, more and more it is becoming typical that the network processor is provisioned by an Original Equipment or Device Manufacturer (OEM or ODM) whereupon the OEM/ODM designs a ROM or other like device to drive specific features that are provided by the ODM.

Problematically, allowing the OS to be provisioned downstream from the manufacturing process is more risky from a security point of view. A software attacker could, for example, install malware or spyware into the chip during the OS install procedure. Often times, the chip is forwarded in the manufacture to several OEM or ODM developers for personalized installation and provisioned. Anywhere along this chain, the attacker might be able to insert attack software.

Another problem emerges as the Internet of Things/Everything and the Cloud of Things (IoT/E), (CoT), slowly takes off. The exact structure is not yet clear what the Internet of Things will look like, but it is becoming clearer and clearer that it will resemble the Internet we have today—with more objects, interconnects, autonomy, and significantly more opportunities for security breaches.

According to research houses Gartner and ABI Research, there will be somewhere between 25 billion and 30 billion devices on the IoT/E, CoT by 2020. Eventually, everyone and everything will likely have a unique IP address. The fact is that IP addresses are going to be to objects of the IoT what social security numbers are to people today. The IoT, everything and everyone will truly be a number—and a possible attack vector.

Depending upon the eventual use of the chip, the effect of such an attack can be anywhere from a nuisance to a serious breach of secure or secret information. In gateways and STBs, for example, an attacker could install a back door to a user's device during the OS install thereby being able to obtain confidential information about the user including banking and personal details.

In particular with widespread installations of OS in cases such as network processors, the problem is exponential. The attacker need only set up the attack once inside the main OS and the OEM or ODM then installs the insecure OS system into thousands and perhaps millions of units. In that case, the attacker would have access to legions of devices on the internet. Such an attacker could, for example, turn hundreds of thousands of user gateways into robots with one infiltration of the manufacturing process.

Attackers have proven to be quite ingenuitive and have used various methods to infiltrate chips in the product process including a type of Trojan Horse. For example, there are custom images providing more advanced features available for download from the internet where the user is trusting that the images were prepared in good faith. Those images may also interfere with specific features in the operator network.

Several systems like State-of-the-Art set-top boxes and gateways now use a secure boot mechanism to inhibit tampering with the software to be executed on such devices. Today's mechanism to ensure such secure boot mechanism starts its root of trust (RoT) by setting up one or more keys (key in the sense of either a private-public key pair [asymmetric] or also 2 private keys [symmetric]) into the semiconductor device during the manufacturing process of the chip vendor.

Such RoT keys may either be done by fusing certain bits/registers during chip vendor device production to hard code in a key or using an OTP (One-Time-Programming) entity on the device. Both systems are known and will not be expounded on here. The storage of keys on the flash or EE2PROM memory was being used as well but is considered attackable and was replaced by the on-chip provisioning.

A one-time password (OTP) is a password that is valid for only one login session or transaction. OTPs avoid a number of shortcomings that are associated with traditional (static) passwords. The most important shortcoming that is addressed by OTPs is that, in contrast to static passwords, they are not vulnerable to replay attacks. This means that a potential intruder who manages to record an OTP that was already used to log into a service or to conduct a transaction will not be able to abuse it, since it will be no longer valid. On the downside, OTPs are difficult for human beings to memorize. Therefore they require additional technology to work. In any event, OTPs do not really address the problem of an attacker who is situated in the OEM/ODM part of the chip production process. Presumably, an attacker with access to the chip at that stage would have access to the OTP.

The Trusted Platform Module (TPM) and the infrastructure around this component are an industry attempt to build a series of "roots of trust" in the platform. "Early on," Trusted Platform Modules were tied to semiconductor (hardware) architectures only. Things evolved with the invention of Secure Element (SE) devices used in smart card technologies and Trusted Execution Environments (TEE) incorporated into general-purpose processor architectures. What has been missing is an integrated Root of Trust embedded in a system on chip (SoC) that provides silicon-based security for the SoC architecture—in ways that harden the TEE against both software attacks and penetration attacks.

At a high level, the TPM typically is a microcontroller with integrated flash/storage that is attached to a bus on a computer system. But it also can be a virtual device, or integrated into a chipset. It is based on an international standard for crypto processors—a dedicated microprocessor designed to secure hardware by integrating cryptographic keys into devices. FIG. 10 shows a TPM chip 1000 that is capable of being connected to a system via a host I/O interface 1002. If the TPM were integrated into the chip, it would likely be done as an IP or function block. Each TPM chip contains an RSA 1004 (the acronym RSA is derived from the initials of the developers of the algorithm, Ron Rivest, Aki Shamir and Leonard Adelman) key pair called the Endorsement Key (EK). The pair is maintained inside the chip and cannot be accessed by software. The Storage Root Key (SRK) is created when a user or administrator takes ownership of the system by the key generation unit 1006. This key pair is generated by the TPM based on the EK and an owner-specified password.

A second key, called an Attestation Identity Key (AIK) provided by an Attestation Identity Key AIK Unit 1008, protects the device against unauthorized firmware and software modification by hashing critical sections of firmware and software before they are executed. When the system attempts to connect to the network, the hashes are sent to a server that verifies that they match expected values. If any of the hashed components have been modified since last started, the match will fail, and the system is denied entry to the network.

Trusted platform modules, when combined with a trusted power-on condition, form what is called the root of trust (RoT). Roots of trust are comprised of a set of functions, within the TPM, that are always trusted by the device's OS. The RoT functions as a separate compute engine that controls the TPM cryptographic processor on the device it is embedded in. The RoT provides the functionality behind trusted computing features including key management, password protection; detection and reporting of unauthorized changes to the operating system, or programs; on the fly drive encryption; rootkit detection; memory integrity; user authentication; network access; data protection; hardware-based digital rights management (DRM) support and more. Once activated, the TPM provides increased security through linkage to other Trusted Computing Group (TCG) specifications that have been developed for networks, such as the Trusted Network Connect (TNC) and self-encrypting drives (SEDs).

This one-two punch provides a level of capability that can manage the security integration of devices. Such devices including desktop PCs, servers, laptops, as well as emerging mobile devices. Today, the TNC's set of network capabilities provides users a level of security that was too difficult, too expensive, or otherwise impractical to deliver in earlier implementation.

On the mobility scene, TCG's Mobile Trusted Module (MTM) is a secure element and specification that was developed for use in mobile and embedded devices. Because of economies of scale, and power and footprint constraints, it has a reduced feature set compared with the TPM developed for a wired computing environment. But it can work cooperatively with TPMs in other devices for complete system security. The effort to develop the complete functionality required for mobile trust continues with the ongoing development of MTM 2.0. With these specifications, network service providers, third-party service providers and end-users all benefit from establishing trustworthy behavior.

And for the embedded systems camp, TCG also has an embedded work group focused specifically on such systems, which will be of significant impact on how objects of the IoT/E, CoT. The workgroup is still in its infancy with one specification out, but it is actively working with the embedded segment to come up with standards and specifications across the industry.

While trusted platforms are one of the best firewalls when designing systems, they may not offer as tight a choke point as might be needed for some applications. In many cases, trusted platforms may well suffice. In other situations, they may not. To establish authenticated communication and trust between two or more parties, as well as to protect information both at rest and in motion requires platforms that are both trusted and secure. For information in motion, it is important to lock down the integrity of the information to ensure it is the same at the receiving end as it was at the sending end.

As the IoT market picks up steam for use with smart homes, factories, cars, health devices, and countless other objects, robust platform security will become a strong requirement to assure integrity within each of these IoT infrastructures. To accomplish all of this, a cornucopia of requirements, standards, certificates, and compliances will be needed. Today, in most cases, security is designed into software starting with a secure boot, then initializing the operating system's security features. Security does exist in hardware, but typically is poorly implemented in support of software that is vulnerable by design. Going forward, if security is properly implemented in hardware, such attacks can be restricted to a single device rather than all devices of the same type.

From a production flow, this means that the key owner (e.g. Carrier or OEM) is using the compiled target image and is encrypting or encrypting and signing it. The corresponding counterpart to such private key is provided by the semiconductor vendor and in the semiconductor manufacturing process such key is programmed in a way into the chip that it is not possible to change such key afterwards (e.g. fuse, eFuse, OTP). Such customer specific chips are then sent to the board manufacturer who mounts the devices onto the PCB and uses the encrypted target image to program into the file system, e.g. flash memory.

A disadvantage of this procedure is the following. First as the devices are only operable with an image with the correct keys, during the board production stage testing of such board has to be done also with a special image also encrypted by the key owner. No fast reaction time or modification in board production is possible. Debugging and tracing is inhibited or very complicated owing to this limitation.

Another disadvantage is that such produced semiconductor devices are exclusively for a single project. The supply chain has to maintain buffer stocks for each device key thus multiplying both the amount of buffer stock, but at the same time disallowing supply flexibility and increased risk of unused buffer stock that has to be scrapped.

Still another disadvantage arises in the setting of copyrighted works. The internet today is rife with unauthorized usage of copyrighted works. From simple screen shots to ripped movies, the internet is rampant with copyright infractions. As the internet of things becomes more of a reality, and virtually all devices in the home become linked to the home gateway, downloading and streaming high definition movies directly from a copyright owner to the home user will become as routine as the toaster oven.

Problematically, an attack at the OS installation stage could be devised to allow an attacker to intercept the downloaded/streamed copyrighted material and copy. In particular, this problem has chilled content providers from providing high def content, particularly newer or popular movies, from reaching the internet. This chilling effect has slowed down one of the major catalysts for bringing the home gateway as a mainstay of technology. As long as content providers suppress content, users will not be encouraged to switch to the home gateway internet of things. On the other hand, providing users with the ability to securely access copyrighted content, particularly valuable or popular content without the threat of that content being ripped off, will help usher in a new age of home connectivity.

Trusted platforms are a step in the right direction. It has only been in the last few years that they have come into widespread deployment, and mostly in the computing infrastructure, in the form if encryption keys. They have a lot more potential, and, with IoT autonomous devices, some worth just a few pennies, others worth mega-bucks, trusted and secured platforms will need to evolve.

From a security standpoint, addressing security for the system's host processor at the design of the SoC and carrying it through the manufacturing supply chain through to the active life of the product, is monumental to establishing robust silicon-based security.

Until now, there has been no satisfactory way to allow OEMs/ODMs to securely provision vendor chips, while avoiding or sufficiently mitigating the risk of an attack during the OS or other OEM/ODM software/firmware installation process.

SUMMARY

Therefore, a need exists to security provision chips. In particular, a need exists for techniques that allow mitigating the risk of an attack during OS or other installation processes.

This need is met by the features of the independent claims. The dependent claims define embodiments.

According to an aspect, a semiconductor device that processes communication signals is provided. The device comprises first transistor logic and second transistor logic. The first transistor logic is arranged by a first logic provided in circuit form and provides a minimum of functionality of the semiconductor device. Said minimum of functionality is employed to bring up the semiconductor device. Said minimum of functionality is encrypted using a first encryption key. The second transistor logic is arranged by a second logic provider. The second logic provided is different than the first logic provider. The second transistor logic is arranged in circuit form to include security keys capable to perform cryptographic capabilities using a second encryption key. The second transistor logic further includes functionality that completes the semiconductor device as a chip device and is ready to process secure communication signals.

According to a further aspect, a chipset is provided. The chipset comprises a memory, an interface, and a media gateway. The media gateway is configured to provide media functionality. The chipset further comprises a processor that is configured to retrieve, from the memory, first boot instructions encrypted by a cryptographic key. The processor is configured to decrypt the first boot instructions and to execute the first boot instructions to operate in an enabling mode. The processor, when operating in the enabling mode, is configured to receive configuration data and to write at least parts of the configuration data comprising second boot instructions to the memory.

By providing the first boot instructions, it becomes possible to provision the chipset that provides a minimum functionality that allows receiving the configuration data comprising at least the second boot instructions. For example, a vendor of the chipset can therefore securely provision the chipset by means of the cryptographic key; at the same time, it is not required that the vendor of the chipset is in possession of the second boot instructions. E.g., the configuration data may comprise an OS or on the software. It may also be possible that the configuration data comprises drivers of components of the chipset; then, the processor may be further configured to install the drivers of the components of the chipset in response to executing the second boot instructions. Installation of the OS and/or the other software can therefore be effectively prevented against an attack by employing the cryptographic key. As will be appreciated from the above, thereby a 2-step secure boot or dual-boot mechanism can be employed.

For example, the second boot instructions may enable the processor to control the media gateway to provide the media functionality. In this regard, it is possible that the second boot instructions when executed provide functionality that is not provided by the first boot instructions. In this sense, the second boot instructions can substantially complete the semiconductor device as a chip device and can allow processing secure communication signals. E.g., the configuration data may comprise a media authentication credential which selectively grants access to the media functionality. E.g., the media authentication credential can correspond to a DRM key. By only provisioning the DRM key together with the configuration data, the vendor of the chipset is not required to be in possession of the DRM key. Generally, it is not required that the configuration data includes the media authentication credential. Rather, it is possible that the media authentication credential is only received during operation of the chipset as initialized by the second boot instructions. E.g., it is possible that the second boot instructions enable the processor to receive the media authentication credential which selectively grants access to the media functionality.

It is possible that the processor, when operating in the enabling mode, is configured to disable any further functionality beyond said receiving of the configuration data and said writing of the at least parts of the configuration data to the memory. In other words, during enabling mode functionality of the chipset may be restricted to preparation of a second boot based on the second boot instructions. Thereby, an attack during OS or software installation can be effectively prevented.

E.g., once the first boot employing the first boot instructions has been completed and enabling mode has been completed—i.e., once the configuration data is written to the memory—it is possible that re-execution of the first boot instructions is not possible anymore. E.g., the chipset may be configured to disable execution of the first boot instructions in response to writing the at least parts of the configuration data to the memory. Thereby, an attacker can be effectively prevented from installing the software than the intended configuration data on the chipset. E.g., the disabling of the execution of the first boot instructions can be hardware-programmed.

Generally, the configuration data may be received employing secure server communication. The secure server communication can mitigate a risk of an attack during said receiving of the configuration data.

E.g., the second boot instructions may be encrypted using a further cryptographic key. By employing the further cryptographic key, it becomes possible to further raise a level of security against attacks during installation of the configuration data including, e.g., the OS or further software. The further cryptographic key may be a key that is known to the operator, but not to the vendor. Thus, the keys of the operator are not exposed to the vendor.

According to a further aspect, a method is provided. The method comprises writing first boot instructions encrypted by a cryptographic key to a memory. The execution of the first boot instructions selectively enables to receive configuration data and to write at least parts of the configuration data comprising second boot instructions to the memory. Therefore, the first boot instructions may provide minimum functionality to a chipset as explained above.

For the method according to the presently discussed aspect, effects may therefore be achieved that are comparable to the effects that can be achieved by the chipset according to a further aspect of the present application.

According to a further aspect, a method is provided. The method comprises retrieving first boot instructions from a memory. The first boot instructions are encrypted by a cryptographic key. The method further comprises decrypting the first boot instructions. The method further comprises executing the first boot instructions to operate in an enabling mode. The method further comprises, in the enabling mode: receiving configuration data. The method further comprises, in the enabling mode: writing at least parts of the configuration data to the memory. The at least parts of the configuration data comprise second boot instructions.

For a method according to the presently discussed aspect, effects may therefore be achieved that are comparable to the effects that may be achieved by a chipset according to further embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

DETAILED DESCRIPTION OF EMBODIMENTS

Figure 1:
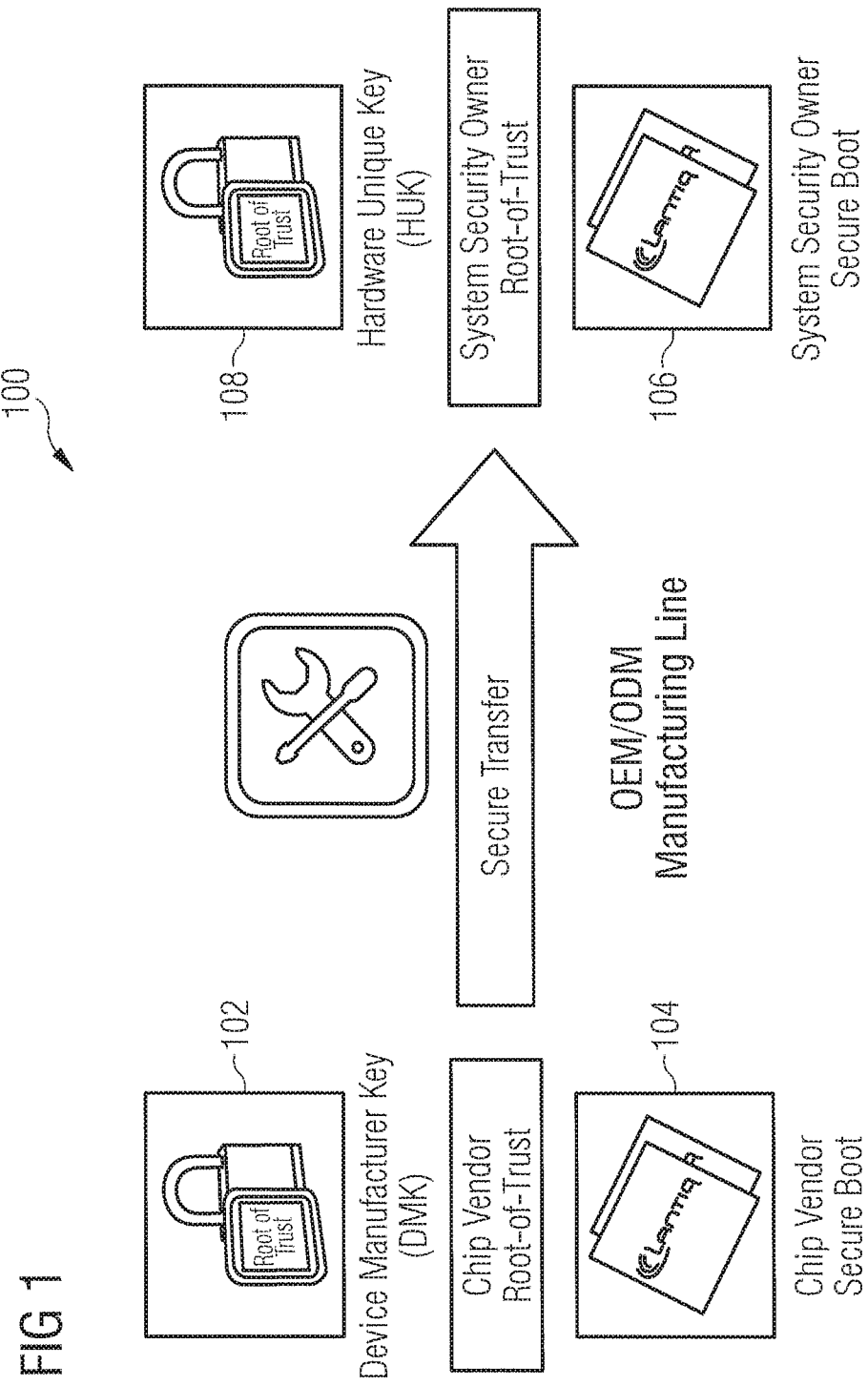
FIG. 1 schematically illustrates the transfer of the root of trust according to various embodiments.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof. While portable electronic devices having an input interface of an embodiment may be wireless communication devices, personal digital assistants, or other portable devices having communication capabilities, the input interface is not limited to being used in such communication devices.

FIG. 1 illustrates the end objective of the secure transfer 100 is to transfer a root of trust RoT 102 from the chip manufacturer or performing chip vendor secure boot 104 to the system security owner (e.g. operator) 108 in order to allow the operator and/or system security owner 106 to perform a secure boot with the new key material. The secure transfer should be performed under secure terms in order to ensure the highest degree possible of protection from an attack, particularly attacks aimed at discovering the keys during, in particular, the OEM/ODM portion of the manufacturing line. The secure transfer could be in the form of transferring a Hardware Unique Key (HuK). The HUK serves as new Root-of-Trust for the System Security Owner to hold the root key to generate software for this device. The transfer uses the chip manufacturers RoT to perform a Secure Boot 104 which programs into the device the new key material. After the transfer is complete the device typically only allows System Security Owner Secure Boot 106 to be used to boot the device. Secure Boot 104 and 106 may use different hardware functions in the device to store and retrieve the RoT.

Figure 2:
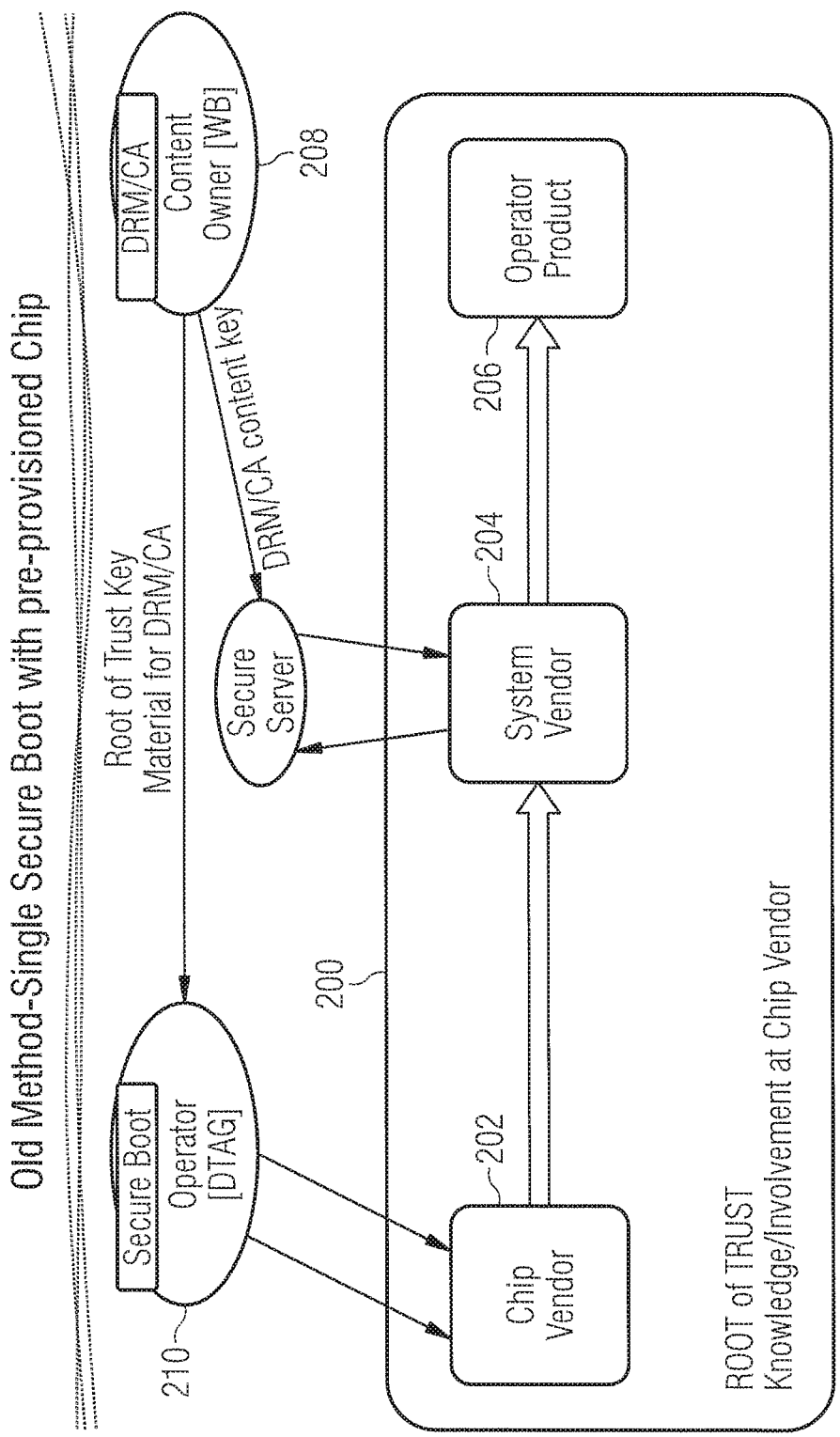
FIG. 2 illustrates the implementation of the root of trust according to reference implementations.

The problem relating to the transfer of RoT where Digital Rights Management (DRM) is concerned is illustrated in FIG. 2. The production flow is shown generally by reference numeral 200 wherein a chip vendor 202 manufactures a chip, for example, through a vendor fabrication plant (fab), or through their own fab, and is shipped in packaged form, i.e., the silicon die cut and packaged in a plastic housing with external connecting pins, to a system vendor 204. The system vendor 204 may be an ODM or OEM. Once the secure contents are installed in the chips, for example, an OS system or vendor specific features, the chip is sold or delivered to an end user and integrated into an operator product 206. The end product may be anything from gateways installed in a modem box, STB, or even smart phone for example.

In a typical scenario, an operator 210, such as the ODM or OEM, 210 may desire to install its own features or OS into the chip. The operator 210 may, for example, be a network carrier. It may further be that the operator may desire to activate the chip or set the chip up as a secure chip to upload copyrighted content such as from a content owner 208. For example, the operator 210 wants to sell chips that will be integrated into STBs or the like (ie, modems or smartphones) that is capable of receiving and decrypting uploaded or streaming movies. In former case, the operator 210 provides the cryptography keys to the chip vendor and in the latter, the content owner 208 provides DRM keys and/or the cryptography keys to the operator 210 who then provides the keys/DRM keys (or both) to the chip vendor. The chip vendor 202 then installs the cryptographic keys or the DRM keys (or both) into the chip. Further down the stream in the production process, the system vendor installs the specifal feature software/firmware or OS using the cryptographic keys. This may also include installing the DRM keys into the special software as part of a secure certificate process, for example, to verify the authenticity of access to a particular movie or channel.

A troubling problem arises in the above scenario because the chip Vendor is entrusted with the operators keys. Worse, the chip Vendor may even have the keys for DRM secured content. In the case where copyrighted content is illegally retrieved, the vendor could very well be found in a court to have been negligent with the care of the keys. Where the copyrighted content has high value, such as a blockbuster movie, for example, the vendor could be liable for damages for millions of dollars. In order to avoid these troubling issues, the proposed solution here provides a secure boot mechanism that restricts the keys or at least the critical keys relating to access of the chip or DRM content.

Figure 3:
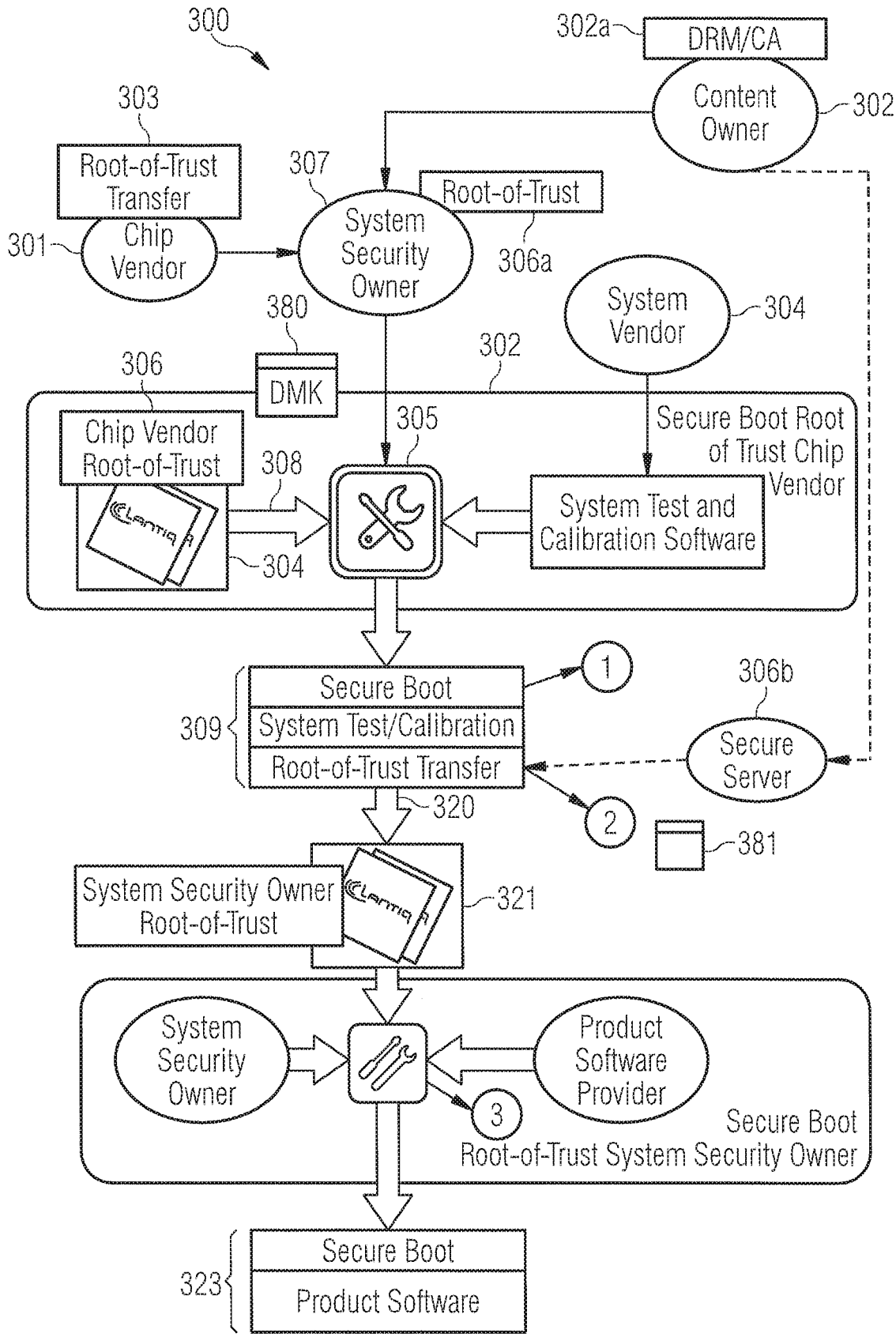
FIG. 3 schematically illustrates the transfer of the root of trust according to various embodiments.

The fundamentals of the proposed mechanism are illustrated in FIG. 3. In the figure there is shown a chip vendor 301 which may be the owner of an DMK (Device Manufacturer Key) 306, e.g., the Lantiq Manufacturer Key (LMK).

In more detail, there is illustrated the 2-step secure boot or dual-boot mechanism that decouples the system security owner's secure boot from the chip vendor. Initially the system security owner, e.g., at the vendor's site, may create an image which complies with the Chip Vendors Root-of-Trust 303. The chip vendors packaged device, e.g., manufactured and packaged by the chip vendor 301, may allow only authentic software to be loaded to perform the RoT transfer. It installs an encrypted boot mechanism onto the chip, via hardware, firmware or software thereby providing a secure boot enabled product, e.g., with a product secure image. The chip vendor 301, for example, creates a key, which may be a master key or local master key, e.g., the device manufacturer key (DMK or LMK) 380, and uses this key to lock or encrypt a secure boot procedure on or in association with a chip (as generally shown by 308 and 309). The secure boot procedure may be stored or pre-stored in an associated memory (not shown) such as a ROM, cache or like either on the same die or connected thereto before installation on the die, neighboring die or board. For purposes of security it may be advisable to store the secure boot procedure in the same package or on the same die, otherwise an attacker could try to obtain the key by removing the external memory device and analyzing that memory device.

The encrypted RoT transfer boot includes at least a minimum of functionality in order to start the chip in a low level operating mode. For example, the chip vendor 301 installs a so-called enabling procedure that, when opened or decrypted with the correct key, e.g., the DMK 380, is capable of executing an enabling routine and enters an enabling mode that starts basic functions of the chip. Thus, the enabling procedure may also be referred to as being based on first boot instructions.

In one embodiment, the basic function provided is to enable the system security owner or operator to install his or her cryptographic keys 381 and/or DRM credentials 302a. Here, the system security owner or operator may write the cryptographic keys 381 and/or DRM credentials 302a to a memory. This and only this functionality may be the only function provided by the enabling mode, e.g., the transferring of the Root-of-Trust. In other words, the enabling routine specifically acts to make the product secure and transfer the credentials into the OTP or non volatile memory.

The chip vendor 301 shares with the system security owner (could be the Service Provider/Operator) the Root-of-Trust transfer key material 303. This enables the system security owner to use the software built tool 305 to create the RoT transfer image 309.

The system security owner will add to this image the new RoT key material and additional credential (e.g. DRM/CA credentials 302a received from the Content Owner). This material could be added manually 306a or using Secure Server communication method 306b.

Once the enabling procedure is installed 320, the boot program or device is effectively locked and in one embodiment the chip is provided to the operator 310, which may be a network provider such as Deutsche Telekom AG (DTAG) or a content provider such as Warner Bros. Alternatively, the content owner or provider 312 may be separate from the operator or service provider 310 and supply DRM or CA keys 302a to the operator or system security owner 310 or 307. The cryptographic keys 380 necessary to first execute the boot program are handed over to the operator, effectively transferring RoT to the new owner, ie, the operator 310.

It shall be appreciated that at this point the chip vendor is no longer in the security picture, i.e., that the chip vendor has no access to the operator's or system security owner's cryptographic or DRM keys 302a. This is particularly important where content providers install DRM keys 302a used to lock and unlock copyrighted content. In that case, the chip vendor 306 or 301 is shielded from any wrong doing or malfeasance in the event that the DRM keys 302a are stolen or cracked. In the case where the stolen content is a block buster film, the damage could be catastrophic. This is the first phase of the boot. The chip vendors device 304 is now only operating with authentic software from the system security owner.

In the second phase of the boot, a system vendor 304 stores their secure keys on the chip. This may be done, for example, by transferring the keys first to a secure server 316. In the case of transferring the system vendor keys to the secure server, the employees of the system vendor do not have access to the keys—they request the server to provide the keys for them to be installed directly on the chip. It shall be appreciated that the first and second boots may be considered a bi-furcated boot or a two-phase boot.

The First Boot

The first boot will now be described in more detail which is generally referenced as (1) in the FIG. 3. The first boot may employ the first boot instructions.

Phase 1: A chip vendor device 304 or chip vendor 301 who designs or has designed and produces or has produced a semiconductor chip for a specific purpose, provides the tools which allows the system security owner (operator, ODM or OEM) to have a chip with a secure image 320 or 309 being created where this first stage of the first boot is locked to the chip device 304 and chip vendor 301 such that no one can replace that if you want to start provisioning the device. The chip vendor thus provides an enabled device to accept the credential 302a programming of the system security owner (operator, OEM or ODM).

Phase 2: After the stage was executed, the system vendor may optionally perform production related testing of the system and set up specific parts of the chip (as is typical in the semiconductor industry—even in today's semiconductor products). Executing such production related software runs in a hardware isolated system with dedicated processor resources and chip hardware isolation. The phase 1 environment cannot be access by phase 2 software or phase 2 hardware modules. The chip vendor or production test software starts up the product phase or phase 2 related hardware and brings up interfaces including system and WLAN interfaces. WLAN calibration of parameters may even occur at this time. After the chip passes this phase, the production test software signals to the phase 1 hardware to completion and result of the tests. The phase 1 environment enters the next stage of the first boot.

Phase 3: Phase 1 environment authenticates the system security owner software, referred as (2) in FIG. 3; here, it may be said that the root of trust transfer takes place. The system security owner then installs the DRM credentials 302a to the device inside the OTP (on chip memory—whichever internal memory is used) and at the end of the installation enable the device to be ready for the second phase or Secure Boot, ie, the productive secure boot or productive secure boot product which may also be called a manufacture secure boot product; the second boot may be based on second boot instructions which are installed in Phase 3 of the First Boot. From this point forward, the device is enabled to allow only the second Secure boot Root-of-Trust to run. In one embodiment, the first boot stage can never be run again on the chip. As can be seen, here, the DRM credentials 302a are prebuilt, i.e., respective control data that includes control data for the second phase already includes the DRM credentials 302a.

The credentials for secure boot and credentials for the DRM 302a optionally both go in at this stage into the chip. In another embodiment the credentials for the DRM 302a are installed from the secure server 306b. A tool, such as an enterprise network application, from the chip vendor 301 or other may be provided to allow the system security owner or vendor to build an image. In that case, the system vendor or other may define a key 381 for the next stage of the first boot.

The system security owner 307 builds a third stage that is builds a "manufacturing image" to transfer the Root-of-Trust to him.

This may be done at the operator site, ie, DTAG or other who provides the tool needed to install the DRM 302a and the credentials for the second secure boot. This image may be used in the manufacturing line when the unit is tested. From then on the chip is accessed, updated or modified using these credentials.

In another embodiment, instead of having DRM/CA keys 302a prebuilt into the 3rd stage, the DRM and secure boot, and/or the DRM/CA keys are installed during execution of $3^{rd}$ stage. In this 3rd stage the chip will authenticate itself using, for example, a software daemon, which actually authenticates to a secure server in a network. This authentication uses chip hardware modules which complement the authentication process. In one set up, the tool sits on the chip 321. In the location where the secure image 309 is loaded to the device 320 and executed on the chip 321, a protocol to communicate with a secure server 306b who hold the keys will be established to retrieve the keys. These key will then be programmed in the chips non-volatile memory. At the end the Root-of-Trust transfer (2) stage will set hardware bits to close the RoT transfer. This is in contrast with the prebuild method described earlier.

As a side note, the ASK (or credential) to start the credential and this credential is exchanged between the chip vendor and system owner 314 by means of PGP credentials. This may be done in whatever secure way is practiced by the system owner.

Second Boot

With reference to FIG. 3, the Second Boot phase shall be explained with reference generally to (3). The Second Boot uses the credentials in the non-volatile memory (e.g. OTP) to start the device in the system security owner key 381 protected secure boot so that the keys 381 the product boots now are the ones only the system security owner knew. The Second Boot may employ the second boot instructions.

This stage includes the DRM credentials 302a which will be used to enable a media gateway functionality. With the secure boot of the proposed solution, the chip vendor neither obtains nor is exposed to the DRM credentials 302a because the DRM credentials come in at the system security owner stage.

At this point, the OEM or ODM, or the entity with possession of the chip, is capable to install the remainder of features into the chip to complete the set up, i.e., install drivers of components of the chipset. This may include proprietary features that make up the particular offering of their product. These may include, for example, legacy broadband capability, power save options, user interfaces, etc. The OEM or ODM added functionality may also be encrypted and accessible only with appropriate credentials. For example, the end user may need to employ the appropriate credentials to start the chip after purchase of the end product, such as a router or set top box (STB), or during everyday use.

Figure 4:
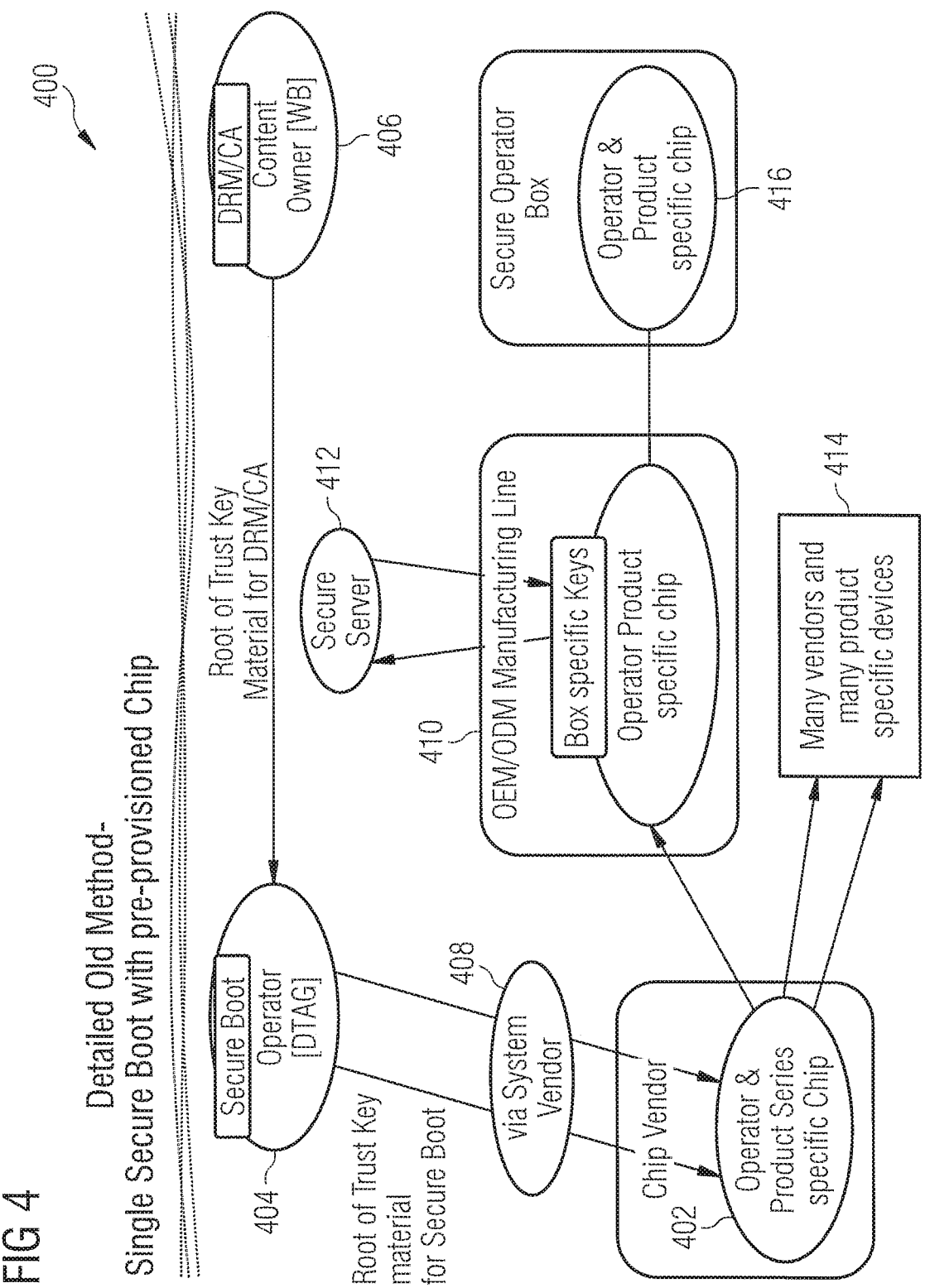
FIG. 4 illustrates the implementation of the root of trust according to reference implementations.

The attendant advantages of the proposed solution shall be readily apparent with a review of the previously employed technique 400 of the inventive entity of this same application (cf. FIG. 4). In this case, the chip vendor 402 essentially sets up the chip entirely at its stage of the manufacturing process and produces an operator and product series specific chip. In this case, the operator 404 provides its credentials and/or DRM/CA credentials to the chip vendor 402. The DRM/CA credentials may even have been provided by a content owner 406. The credentials and/or DRM/CA credentials may even be provided through a system vendor. In addition to installing the credentials to run the chip, the chip vendor also may set up operator specific features in the chip.

Naturally, all precautions are taken to ensure that the credentials and/or DRM/CA credentials are not compromised. However, should there be a breach of security, the chip vendor 402 may find it difficult to prove that no malfeasance has occurred. Evidence of an outside attack may leave no trace to prove that the chip vendor was not culpable. To continue, the OEM/ODM 410 may instead provide their own functionality at their stage of the manufacturing process.

Figure 5:
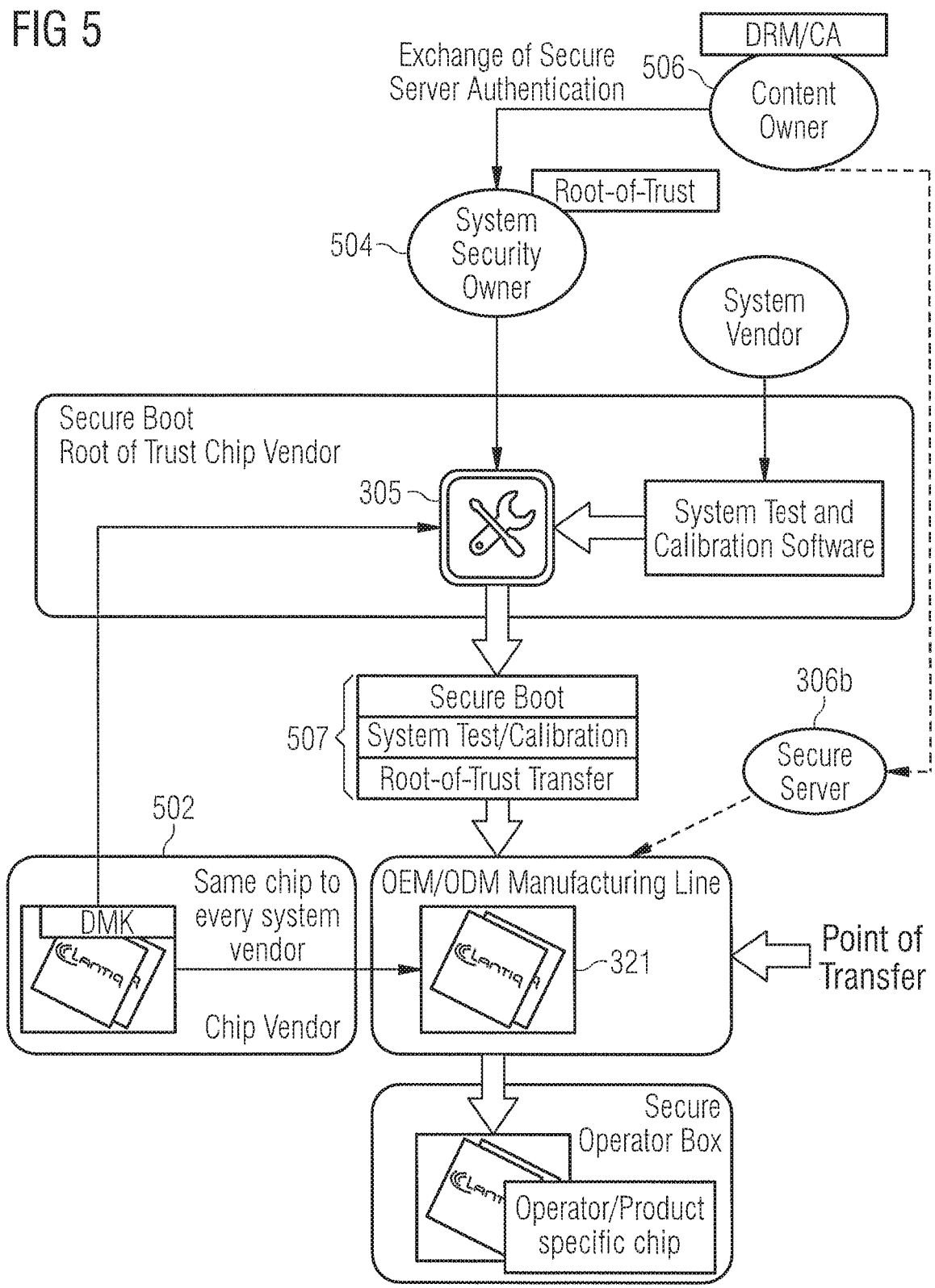
FIG. 5 schematically illustrates the transfer of the root of trust according to various embodiments.

The attendant advantages of the proposed solution shall be better appreciated with reference to FIG. 5. Here it is clearly seen that the chip vendor 502 never comes into contact with credentials of the system security owner (e.g. operator) 504 or DRM or CA credentials of the content owner 506.

The proposed solution has been described with reference to FIG. 3 in terms of a manufacturing technique. The proposed solution is also characterized as a boot device that has sufficient functionality only for the purpose to allow the chip to boot with the minimum of functionality in order to allow the chip to then be installed with the credentials of the system security owner (e.g. operator) 502 or the DRM or CA credentials of the content owner 504. The minimum of functionality means that the encrypted boot includes at least a minimum of functionality in order to start the chip in a low level operating mode. For example, the chip vendor 502 installs a so-called enabling procedure that, when opened or decrypted with the correct key, is capable of executing an enabling routine and enters an enabling mode that starts basic functions of the chip. In one embodiment, the basic function provided is to enable the operator to install his or her cryptographic keys and/or DRM credentials. This and only this functionality may be the only function provided by the enabling mode. In other words, the enabling routine specifically acts to make the product secure and transfer the credentials into the non-volatile memory (e.g. OTP).

Figure 6:
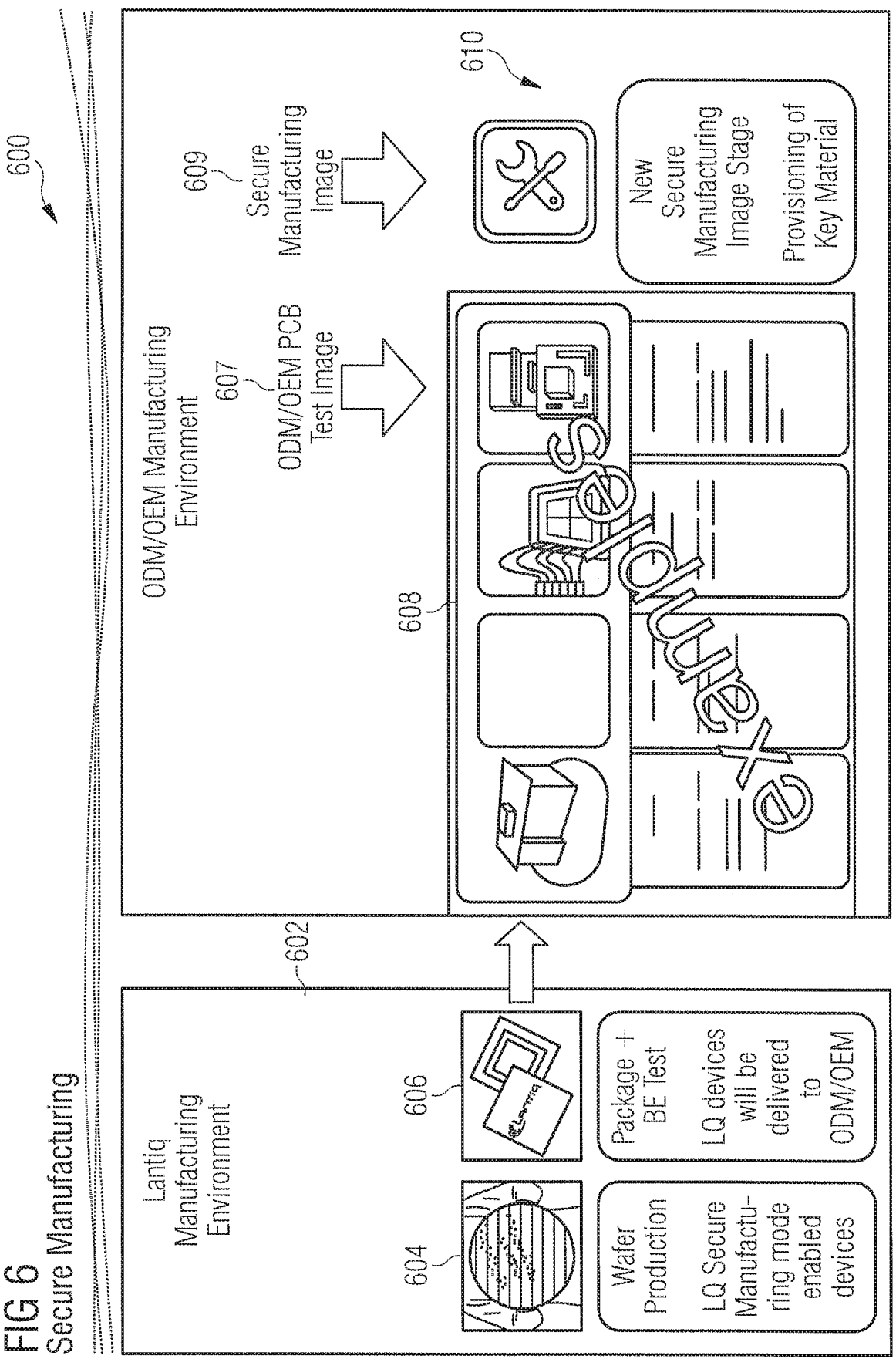
FIG. 6 illustrates techniques of secure manufacturing according to various embodiments.

The proposed solution is also a secure manufacturing solution that may be applied to a manufacturing cycle or manufacturing line 600 as shown in FIG. 6. In a chip vendor's environment 602 begins at wafer production 604, which produces secure manufacturing mode enabled devices. In one embodiment the minimum functionality is created on the chip directly as hardware, for example, transistors, circuits, or other logic, etc. The chip vendor 602 installs a so-called enabling procedure that, when opened or decrypted with the correct key, is capable of executing an enabling routine and enters an enabling mode that starts basic functions of the chip. In one embodiment, the basic function provided is to enable the operator to install his or her cryptographic keys and/or DRM credentials. This and only this functionality may be the only function provided by the enabling mode. In other words, the enabling routine specifically acts to make the product secure and transfer the credentials into the OTP.

In this phase of the manufacturing technique, the chips are optionally singulated, in other words cut from the wafer, and packaged into plastic (or other typical materials employed in the semiconductor industry) housings with the appropriate wire and pin layouts as required by the end customer. The packaged chips are tested, for example, subjected to a back end (BE) test. The BE test in this proposed solution will be limited to the minimum set of functionality installed on the device.

In the next chain of the manufacturing technique, the packaged or unpackaged device is physically transferred in ownership to the ODM or OEM 607. In many instances the chip or packaged device may be located in the same location, i.e., the ownership is transferred, but not the location of the chip or packaged device.

Optionally, the ODM or OEM 607 may perform one or more of ICT, flying probe, boundary scan or functional testing, including hardware or software evaluation when the device is powered, as generally referred to as 608. Optionally, the ODM or OEM 607 may install logic into flash memory or memory/programmable logic, such as PROMs etc, by setting transistors in accordance with logic schemes. The latter may be performed, for example, with a PCB test image applied to the device installed on a PC Board.

With or without testing by the ODM or OEM 607, the ODM or OEM installs the secure manufacturing image. As described with reference to the previous figures, the secure manufacturing image 609 may include particular functions that the ODM or OEM desire to be built onto the device. The ODM or OEM includes within the secure manufacturing image the credentials or the DRM or CA credentials of the content owner (FIG. 3).

Now with reference to FIG. 7, the secure manufacturing image tool 700 (referred to hereinafter simply as the image tool) will now be described. The image tool 700 is that tool which the System Security Owner (FIG. 3) or ODM or OEM employs to install their secure manufacturing image that provision product key components. It also allows the system security owner ODM or OEM to generate a secure boot image, meaning a boot image that is secured with the credentials or DRM or CA credentials of the content owner. In one aspect of the image tool, the image is only used once during the manufacturing at the ODM or OEM and cannot be used again on the same chip.

The key components that are provisioned in the product are cryptographic protected by the Root Key. The feature credential is provided by the chip vendor at 702.

The product test software is further provided by the ODM or OEM at 704, the so-called man in the middle, who provides the manufacturing software and boot parameters to the system security owner. In one aspect the manufacturing software and boot parameters are provided by the OEM and are not known by the ODM. In the latter case, the ODM then receives the secure manufacturing image 709 or installs its own manufacturing flow.

The system security owner (e.g. operator) at 708 may optionally use the image tool in order to sign and or encrypt the device or provided components. In one aspect, the system security owner (e.g. operator) uses a one time password or non-volatile memory image tool to create key material for the chip, signs and adds the encryption keys.

Figure 7:
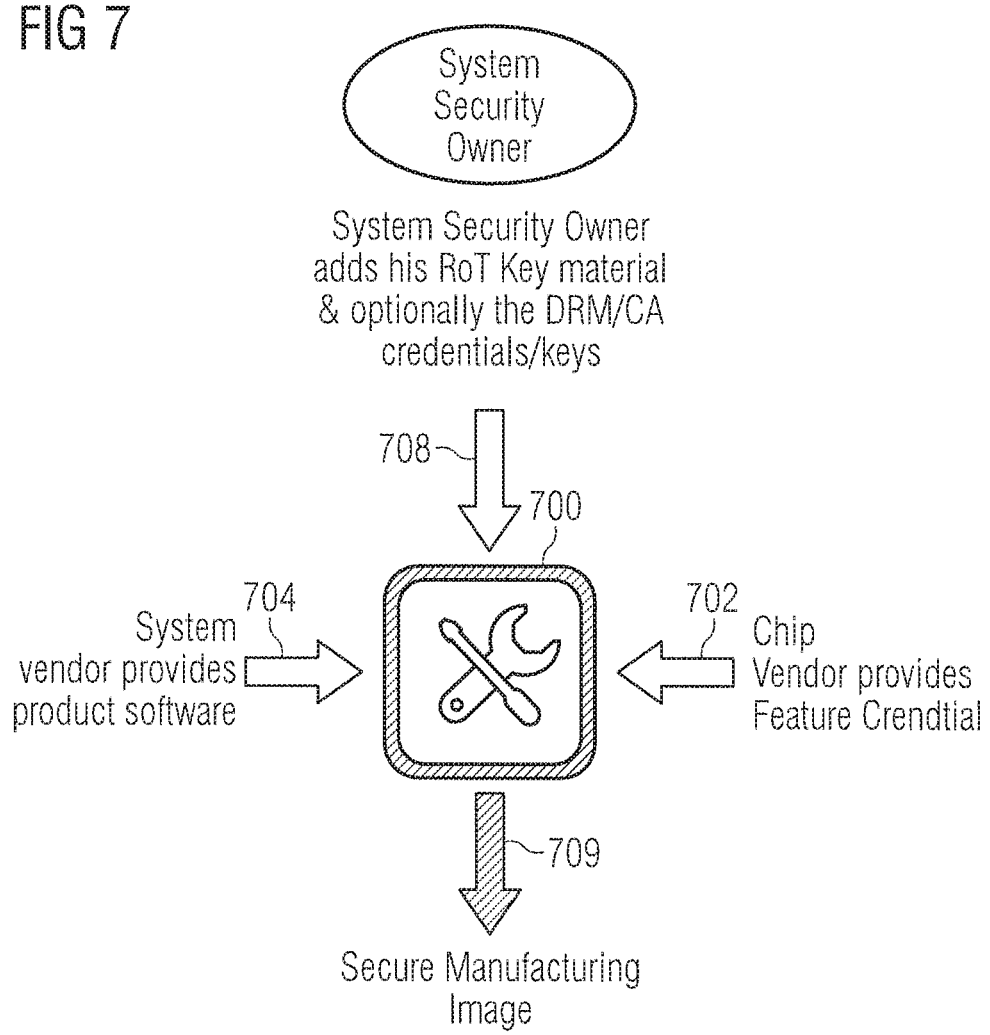
FIG. 7 schematically illustrates the transfer of the root of trust according to various embodiments.

As shown in the FIG. 7 generally by reference 708, the tool is passed from one party to the other and each party adds their key. The tool may be operated by the system security owner combining the components from each party. By using the secure manufacturing image tool the system security owner will get as output the secure manufacturing image.

Figure 8:
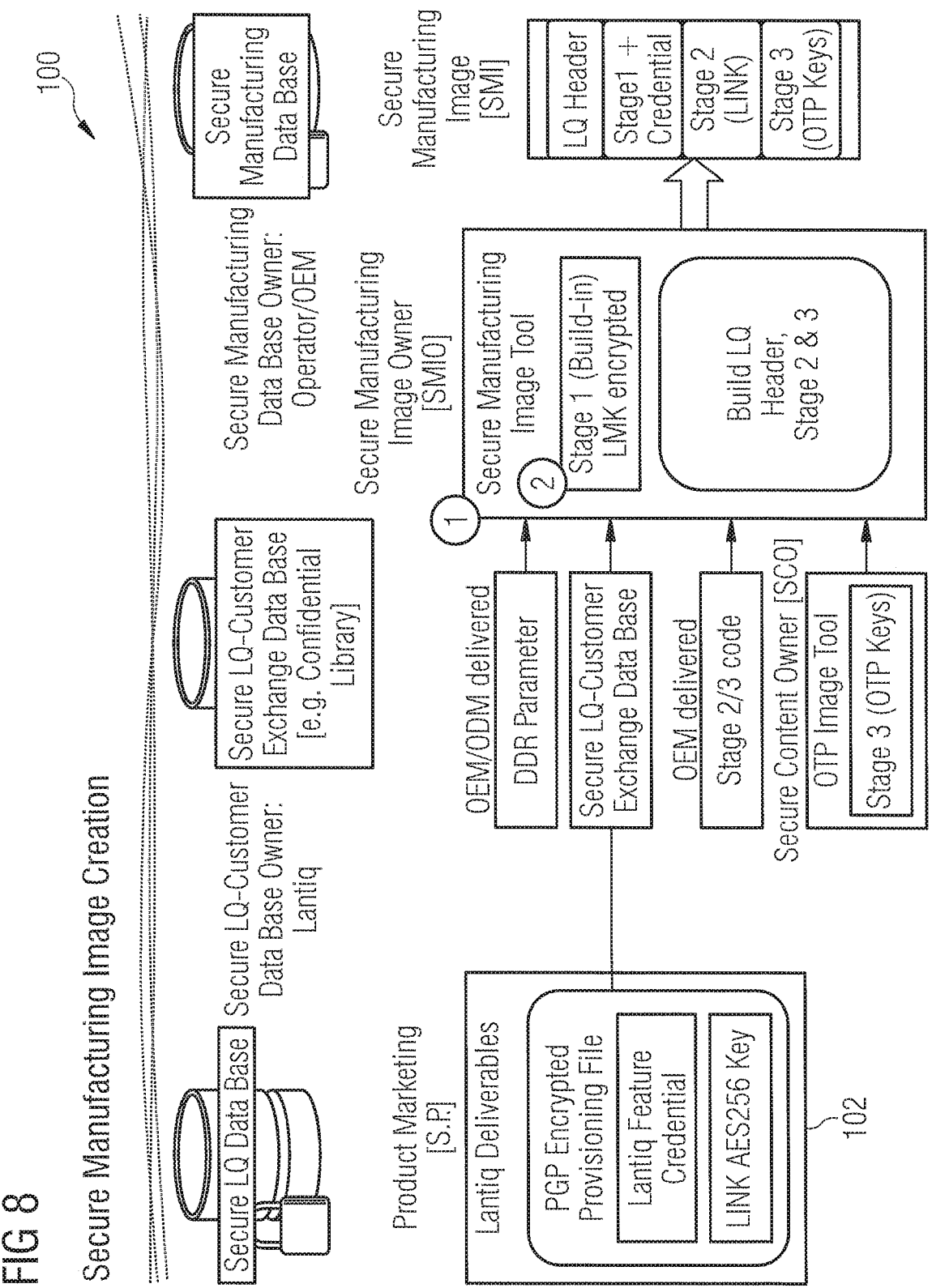
FIG. 8 schematically illustrates the creation of a secure manufacturing image according to various embodiments.

The secure manufacturing image creation 800 will be better understood with reference to FIG. 8, wherein it shall be seen that the secure manufacturing image (SMI) 802 is comprised of a header 802*a* and multiple discrete stages 802*b*. . .*n*. The header 802*a* includes a parameter to inform the Boot ROM that the image is 'LQ-secure'. The header 802*a* may include DDR tuning parameters. The header may also include addresses and/or length of one or more stages, which are used later in the manufacturing technique to allow the ODM or OEM to access the later stages. The parameters preferably are encrypted, such as with the LMK already described, which may be an AES, such as a 256-bit AES.

Preferably, the header 802*a* only includes parameters, and is not allowed to have executable logic, which could be used to bypass the ROM code. As another option, a chip vendor specific feature credential may be added after the LQ Header. As the credential is encrypted it needs only to be passed at a fixed position so that the boot loader can decrypt and use it. The chip at this point is placed in a secure mode as an indication to ROM code to expect the Lantiq Feature Credential after the header.

In one aspect, the LMK is hardwired as part of the logic of the chip. The LMK could be, for example, made to be only readable from a clear-on-read register that clears the register once the register is read. In another aspect of the proposed solution, the chip may be used as a non-secure device and is set to "non-secure" mode. In that case, the LMK key will be discarded. For "secure" mode the LMK key is used to decrypt one or more later stages, but most notably the first stage of the image.

The AES is typically provided as part of the deliverable to end owners of the chip offered with the Secure Manufacturing Tool. Naturally, different users would receive a different AES. The AES in one aspect is required to be used to encrypt the DSA Public Key for the user and "Customer 256-bit AES PSO". The first stage bootloader code includes this key and will allow Lantiq to not release the bootloader code. The bootloader can stay as encrypted binary.

The Provisioning Tool should be released via UGW to customers—"Lantiq Feature Credential" will be generated using flow in FIG. 8. The output of the tool should be a "PGP encrypted Provisioning File" which includes the 32-bit LQ Credential ID (LCID), OEM Config, OEMC Register (RD only) and PPM Register (RD only) content.

In at least the first stage 802*a* the header is read using the AES key. After passing the AES key test, the stage enters a secure mode. The boot device installed by the chip vendor is decrypted at the address indicated by the header and executed. In a second stage, the boot device is activated and uses the LMK key to decrypt any logic that needs to be executed. In stage 3 OPT programming of the secure product keys is performed.

It shall be appreciated that the proposed solution provided herein may be implemented as software, firmware, hardware, transistor logic or rearrangeable logic. However, in order to guarantee a level of security it would be necessary to provide the one, more or all aspects of the proposed solution in physical form, i.e., firmware, hardware, transistor logic, or rearrangeable logic.

In furtherance of the security aspect of the proposed solution, there is further provided a secure data base system 804 that may include several secure database libraries. In one aspect, the secure database system includes a database 806 that is owned by the chip vendor. Preferably, a trusted employee of the chip vendor, the so-called security officer has access to the database. In such an arrangement, the security officer's access is restricted, for example, of being able only to have access to the LMK (discussed previously with reference to FIG. 3, for example) that is stored encrypted in the database and is installed into the chip. In a further arrangement, the security officer may be capable of using the LMK to start the device that creates the secure image into the chip.

In a further aspect, the secure database system includes an exchange database 808 that is included either in the same database as database 806, partitioned in the database 806, or as a physically separate database. The exchange database includes functionality and features that may be provided by either the chip vendor or the OEM/ODM. The exchange database would allow either party to develop and offer improvements on the functionality and features shared between the parties.

Figure 9:
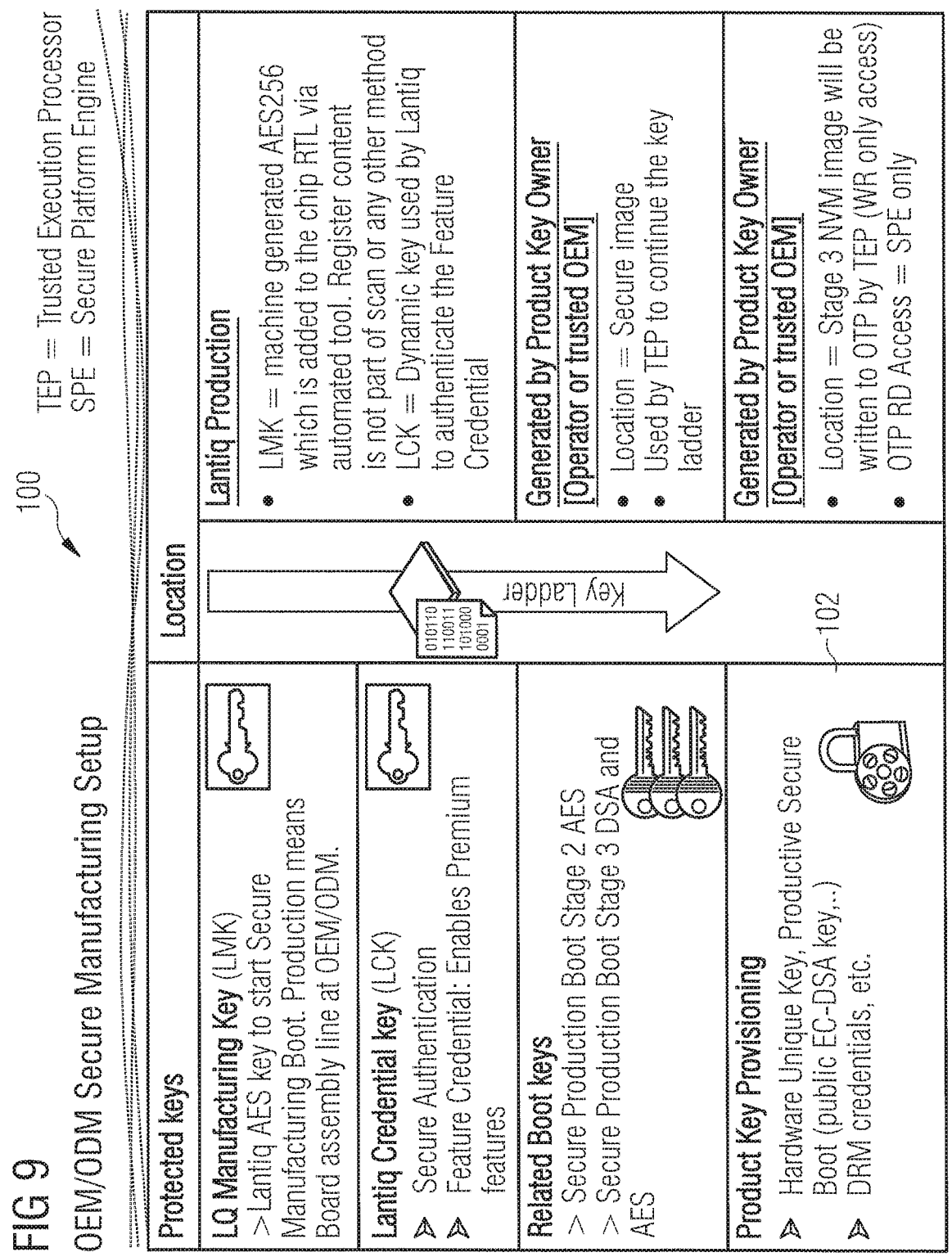
FIG. 9 schematically illustrates a secure manufacturing setup according to various embodiments.
Figure 10:
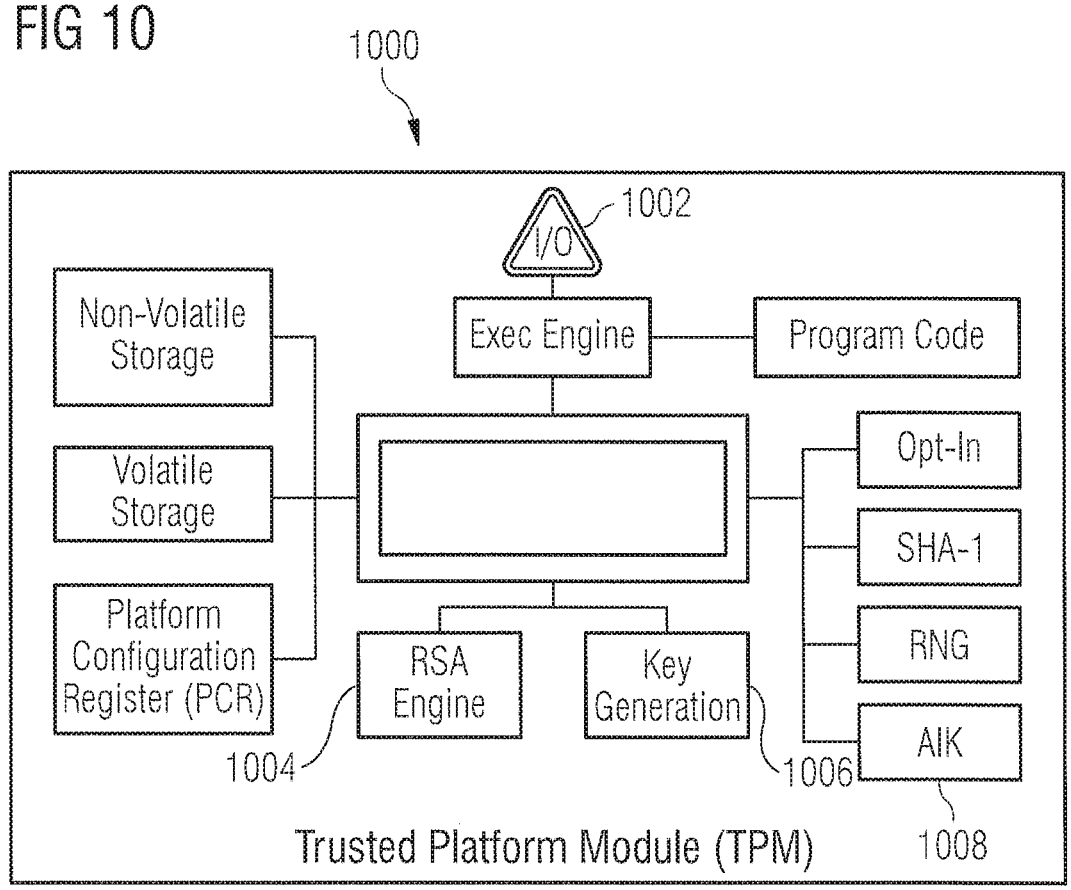
FIG. 10 schematically illustrates a trusted platform module.

The OEM or ODM secure manufacturing setup 900, which is another aspect of the invention, shall be discussed with respect to FIG. 9. In FIG. 9, there is shown a key ladder 902 that pictographically illustrates the location of the protected keys. The LMK 904 is located at the chip vendor, who starts the secure manufacturing boot technique. The board assembly line is controlled by the OEM or ODM. The LMK is a machine generated key, for example, a AES256, which is added to the RTL of the chip, i.e., the transistor logic, which may be accomplished by an automated tool.

In another embodiment, the chip vendor may employ additional keys such as a LCK Local Credential Key 906, which is a dynamic key to authenticate specific feature credentials. The LCK may also be used to secure authentication and enable premium features. Premium features, for example, may be hard wired onto the chip and only activated for particular customers.

Next, related boot keys 908 may be provided for that, for example, may further be one or more secure production boot stages. The related boot keys are typically generated by the product key owner, such as an operator or a trusted ODM or OEM. The related boot keys are typically stored in the secure image.

The next rung in the key ladder illustrates product key provisioning 910, wherein a hardware unique key and/or productive secure boot (for example, public EC-DSA key) are provisioned. In addition to or in the alternative, DRM credentials are provisioned at this stage. The product key provisioning is generated by the product key owner such as the operator or a trusted OEM or ODM.

A particular advantage of the proposed solution described herein is that a single chip design may be employed for a variety of end functionalities. In other words, a single chip design may encompass multiple sets of functionalities. In that sense, the chip may have different images or different identities depending on which key is used by the ODM or OEM. For example, the chip may include both a secure and non-secure mode. If the OEM or ODM employs a non-secure mode, that is does not use a key to unlock the secure boot, then the chip will boot without unlocking the encrypted portions of the chip. In that case, the chip may be used as a normal chip without secure capability. It may be, for example, that the OEM or ODM does not need to protect copyrighted content.

In other cases, the OEM or ODM may desire to product a chip that is capable of securing content. In this case, the OEM or ODM is provided with a key, such as the LMK, that allows it to access the secure boot and other features related to a secure environment.

In another example, the chip may include different sets of features for different ODMs or OEMs. Some OEMs or ODMs may wish to have certain functionality, such as having legacy connection to older standards such as ADSL, whereas other ODMs or OEMs only desire to supply customers with VDSL2 products.

It will be appreciated that providing a chip according to the proposed solution with multiple uses requires a single chip design, which has an enormous impact on fab cost as well as provide economies of scale since a single stock of chips can be applied to multiple uses. This has a large effect on logistics planning, since a chip vendor must not need to estimate how many of a particular type of chip must be produced for expected sales. Further, should the ODM or OEM cancel or return their order the chips can be resold to another purchaser.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A chipset, comprising: a memory,
   a processor configured to retrieve, from the memory, first boot instructions encrypted by a cryptographic key,
   wherein the processor is configured to decrypt the first boot instructions and to execute the first boot instructions to initiate and operate in an enabling mode that enables a low level operating mode that starts basic functions of the processor,
   wherein the processor, when operating in the enabling mode, is configured to receive configuration data and to write at least parts of the configuration data comprising second boot instructions to the memory,
   wherein the processor, when operating in the enabling mode, is configured to disable any further functionality beyond said receiving of the configuration data and said writing of the at least parts of configuration data to the memory.

2. The chipset of claim 1, further comprising: a media gateway configured to provide media functionality,
   wherein the second boot instructions enable the processor to control the media gateway to provide the media functionality.

3. The chipset of claim 1,
   wherein the second boot instructions are encrypted by a further cryptographic key.

4. The chipset of claim 2,
wherein the configuration data comprises a media authentication credential which selectively grant access to the media functionality.

5. The chipset of claim 2,
wherein the second boot instructions enable the processor to receive media authentication credential which selectively grant access to the media functionality.

6. The chipset of claim 1,
wherein said disabling of the execution of the first boot instructions is hardware-programmed.

7. A chipset, comprising: a memory,
a processor configured to retrieve, from the memory, first boot instructions encrypted by a cryptographic key,
wherein the processor is configured to decrypt the first boot instructions and to execute the first boot instructions to initiate and operate in an enabling mode that enables a low level operating mode that starts basic functions of the processor,
wherein the processor, when operating in the enabling mode, is configured to receive configuration data and to write at least parts of the configuration data comprising second boot instructions to the memory,
wherein the chipset is configured to disable execution of the first boot instructions in response to writing the at least parts of the configuration data to the memory.

8. The chipset of claim 7, further comprising: a media gateway configured to provide media functionality,
wherein the second boot instructions enable the processor to control the media gateway to provide the media functionality.

9. The chipset of claim 8,
wherein the configuration data comprises a media authentication credential which selectively grant access to the media functionality.

10. The chipset of claim 8,
wherein the second boot instructions enable the processor to receive media authentication credential which selectively grant access to the media functionality.

11. The chipset of claim 7,
wherein said disabling of the execution of the first boot instructions is hardware-programmed.

12. The chipset of claim 7,
wherein the second boot instructions are encrypted by a further cryptographic key.

\* \* \* \* \*